United States Patent
Anisimovich et al.

(10) Patent No.: US 7,734,065 B2
(45) Date of Patent: Jun. 8, 2010

(54) METHOD OF TEXT INFORMATION RECOGNITION FROM A GRAPHICAL FILE WITH USE OF DICTIONARIES AND OTHER SUPPLEMENTARY DATA

(75) Inventors: Konstantin Anisimovich, Moscow (RU); Vladimir Rybkin, Moscow (RU); Alexander Shamis, Moscow (RU)

(73) Assignee: ABBYY Software Ltd., Nicosia (CY)

( * ) Notice: Subject to any disclaimer, the term of this patent is extended or adjusted under 35 U.S.C. 154(b) by 1003 days.

(21) Appl. No.: 11/428,841

(22) Filed: Jul. 6, 2006

(65) Prior Publication Data

US 2008/0008386 A1 Jan. 10, 2008

(51) Int. Cl.
*G06K 9/00* (2006.01)

(52) U.S. Cl. ............... 382/111; 382/181; 382/176; 382/171; 382/174

(58) Field of Classification Search ............ 382/111, 382/101, 110, 100, 137, 181, 176, 171, 174
See application file for complete search history.

(56) References Cited

U.S. PATENT DOCUMENTS 5,390,259 A * 2/1995 Withgott et al. ............ 382/173
5,680,478 A * 10/1997 Wang et al. ............... 382/176
5,875,263 A * 2/1999 Froessl ..................... 382/181

* cited by examiner

*Primary Examiner*—Samir A Ahmed
*Assistant Examiner*—Ruiping Li
(74) *Attorney, Agent, or Firm*—Hahn & Moodley LLP; Vani Moodley, Esq.

(57) ABSTRACT

The present invention deals with text comprising image parsed to graphemes. A result of character recognition is creation of one or more versions of characters for each grapheme. All possible words versions are obtained using all characters versions, and all parsing versions are examined. A supplementary data of several types is applied successively in the preliminarily prescribed order to the examined words. The processing with the use of supplemental data may be represented as a three times repeated processing of the same text fragment with the use of supplementary information becoming available at each time. The examination comprises three steps. 1) A set of chains LPG is built using all obtained recognized grapheme-to-character versions. 2) All obtained versions are analyzed with the successive application of subsequent supplemental data types in connection with the preliminarily assigned order or with a joint application thereof. 3) A supplementary space recognition correction.

11 Claims, 1 Drawing Sheet

METHOD OF TEXT INFORMATION RECOGNITION FROM A GRAPHICAL FILE WITH USE OF DICTIONARIES AND OTHER SUPPLEMENTARY DATA

The present invention relates generally to image recognition from a graphical representation and particularly to text recognition at a document image in an electronic form.

Methods of preliminary processing of graphical images, consisting in partition of an image into regions, presumably comprising paragraphs, lines, words, separate characters, are known in the art.

The invention relates to processing of character images, recognition of character groups, words, word groups etc. with use of supplementary information

APPLIED TERMS

Recognition version, as supposed herein, is one of some versions of graphemes interpretation and word composition results. One of some versions of an image fragment linear partition into words, characters. A result of recognition of fragments (arcs) of linear partition graph (hereinafter—LPG) and graphemes interpretation.

Pattern as supposed herein is a type of language structure of word level. Examples: an English letter word, a number, a telephone number, URL.

Translation as supposed herein is transition from a character graphical representation (grapheme) to a character itself. Text fragment as supposed herein is an object level, the most part of processing is realized for: versions construction in accordance with patterns, their estimation and selection of the best one.

Pair wise (differential) comparator as supposed herein is a method of estimation of text fragments versions. The method consists of a plurality of rules to perform pair wise versions comparison as well as total estimation.

Dictionaries of various types, a document particular language rules, a document subject matter—literary text, scientific article, filled in form may be used as a supplementary data. Use of supplementary data allows increasing the recognition accuracy in the following cases:

- to choose the most correct variant of linear partition of line fragment into characters from several ones,
- to choose the most correct variant of character image recognition with use of several classifiers,
- to choose the most correct characters or ligatures, that may be represented by the chosen grapheme, to analyze a considerable portion of recognized text (a line, for example) and to adjust the results of recognition as far as possible. For example, to change a comma for a full stop, at the end of a sentence, or to connect two French words "d'" and "Alembert" into one.

PRIOR ART

A method of text characters recognition using supplementary information is known in the art. The patent RU No. 2234734 discloses a method of character images and text fragment processing, comprising a number of consecutive steps. Supplementary information (mostly of spatially—parametrical type), that becomes available at each stage, is gathered and then used during iterative analysis of the same fragment.

The mentioned method uses a limited set of supplementary information, leaving apart (not applying) data from additional sources, information, based on the language peculiarities, other kinds of external information. The method doesn't take into account the order of the appliance to different data sources.

The technical result of the present invention consists in the accuracy and noise immunity increase in text recognition.

Prior method mentioned herein as well as any other known method fails to achieve required recognition accuracy level.

The declared technical result is achieved via using particular language specific rules and a set of supplementary rules, paying special attention to the order of appliance thereto.

SUMMARY OF THE INVENTION

According to the present invention the stage of character recognition is performed after partition of an image, presumably containing text, into fragments, presumably containing characters (graphemes). The result of the said each separately taken character recognition comprises one or more versions of characters for each grapheme. On the next step all characters are combined into groups, presumably comprising words. All possible words versions are obtained using all characters versions, and all partition versions are then examined. Also one or more neighboring groups are taken into account as a possible part of the same word. A supplementary data of several types is applied to the examined words. The said supplementary data is applied successively in a preliminarily prescribed order. The said supplementary data is taken from several sources in the amount sufficient to gain the prescribed recognition accuracy level, taking into account the required calculating resources.

REFERENCE POINTS OF DESCRIPTION

Figure 1:
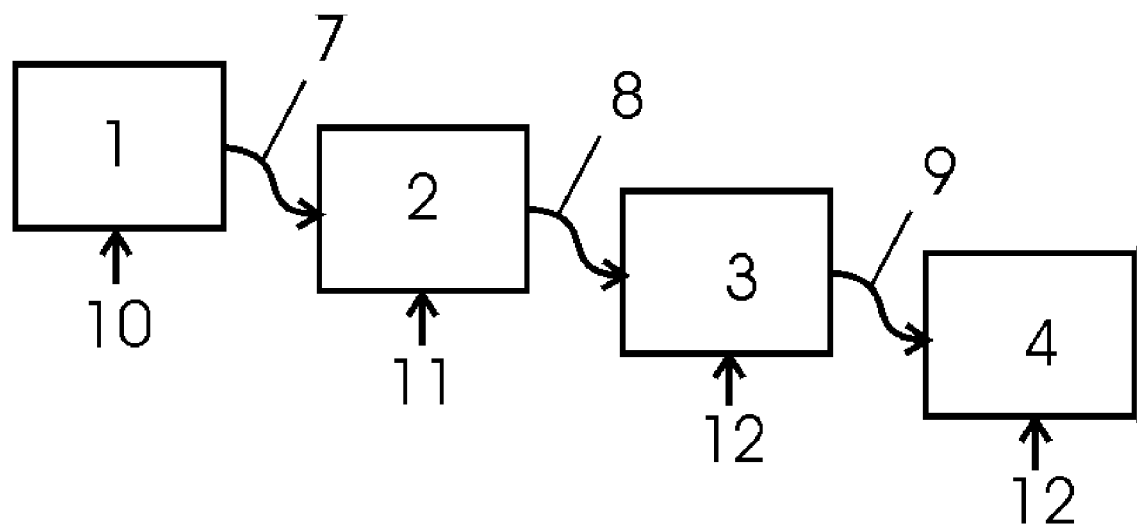
FIG. 1 shows the main steps of characters, line fragments, whole lines recognition with use of supplementary data and comparison means.

1—a step of chains building on LPG over the plurality (group) of graphemes.
2—a step of building of character groups versions in accordance with patterns.
3—a step of obtained versions total (generalized) estimation.
4—a step of obtained versions pair wise sorting.
5—a step of final solving of interpretation ambiguities.
6—a step of choosing of the of the chain best version for a line.
7—chains on LPG.
8—versions.
9—sorted list of versions.
10—document language rules.
11—patterns.
12—comparison means.
13—version list.

DETAILED DESCRIPTION OF THE INVENTION

After partition of an image, presumably containing text, into fragments, presumably containing characters (graphemes), a step of character recognition is performed.

The result of the said each taken separately character recognition comprises one or more versions of characters for each grapheme. On the next step all characters are combined into groups, presumably comprising words. All possible words versions are obtained using all characters versions and all partition versions are then examined. Also one or more neighboring groups are taken into account as a possible part of the same word.

A supplementary data of several types is applied to the examined words. The said supplementary data is applied successively in a preliminarily prescribed order. The said supplemental data is taken from several sources in the amount sufficient to gain the prescribed recognition accuracy level.

The said examination comprises the following steps.

The following list of supplementary data types to apply to and an application order thereof is preliminarily assigned.

1). Information about line-to-character partitioning (dividing points of line into characters).

2). Grapheme recognition accuracy level.

3). Dictionary of the allowable document language (complete words).

4). Dictionary of the allowable parts of words, for example, trigrams.

5). Rules resulting from (caused by) applied typical (standard) data patterns.

6). Rules resulting from (caused by) a spatial position of the word within the line or the paragraph.

7). Rules resulting from (caused by) peculiarities of the document language.

8). Rules resulting from (caused by) a type of the document.

9). Supplementary rules for rare cases.

All or a part of the above listed supplementary data types may be applied for examination. But the application order thereof is mandatory.

A reliability estimation for each supplementary data type is also preliminary assigned.

All possible partition versions of image fragments, presumably representing text lines, into fragments, presumably concerning images of separate words are determined by the reliably recognized spaces.

For each line fragment, presumably representing a word, a particular Linear Partition Graph (LPG), describing versions of partition thereof into graphical elements, relating to characters (graphemes) images, is then built.

The said graphemes are then recognized with use of two or more classifiers of different types, and particular reliability estimation is assigned to each grapheme recognition version.

An interpretation of graphemes comprising a word as an alphabet character is performed with use of versions with the highest character recognition estimation values.

Corresponding recognition versions of a word are generated.

One or more LPG chains (connecting initial and final graph nodes) corresponding to selected graphemes partition and recognition versions are marked out.

All obtained versions are divided into the following types:
all characters of a word are capital (upper case) letters,
all characters are small (lower case) letters,
the first character is capital, all the others—small characters,
version, selected on the base of the performed grapheme-to-character interpretation estimation with the use of supplementary data of the first type (namely, information about line-to-character partitioning points).

If more than one character version according to the results of graphical element recognition is obtained, they are processed with consecutive applying of further types of supplementary data according to the said preliminarily prescribed order.

An additional correction of spaces recognition mistakenly recognized on the previous steps is then performed.

New rules and restrictions for data types addition may comprise new rules for data types. Said new data types may be simple or compound, the said compound data types are formed as a combination of two or more simple and/or compound ones.

Rules and restrictions comprise also the use of patterns of one or more types.

Description of the image recognition process with the use of supplementary data.

The processing with the use of supplemental data may be represented as a thrice-repeated repeated processing of the same text fragment ($_{check\ spelling}$).

Graphical images of text lines are divided into fragments using recognition means with the further analyzing thereof one after another from left to right. For each line fragment a LPG for characters, describing fragment-to-graphemes parsing versions, is built, with the further recognition of the said graphemes, using classifiers of at least two different types.

Then the first processing of LPG is performed using a supplemental data.

The First Processing.

The first processing comprises the following steps.

1. One or more LPG chains starting from the initial graph node to the final one are selected. In each said chain one or more of a plurality of recognition versions of a character with the highest reliability estimation value is selected. Several said chains are further selected using a supplemental data and sorted in overall recognition accuracy value decreasing order.
2. Thus obtained plurality of LPG chains is processed to match patterns, describing a variety of words, allowable in the text. Since a grapheme may represent several different characters, the word version may comprise several different versions of a certain character. A number of permissible versions thereof is reduced to some extent by the use of patterns (for example, pattern of word admits only all-letters version, a number pattern admits only all-numbers version).
3. All obtained versions are estimated by the total (overall) reliability value, and some of the best versions are sorted using pair wise comparison rule.
4. A fixed number of the best versions are then picked out from the sorted list for further (second) processing.

The following parameters are used for versions estimation and comparison:

Graphemes recognition accuracy of each version (path quality).

Pattern grammar compliance (pattern quality). The stronger is the pattern grammar and the higher is the pattern use rate, the higher preference is given thereto.

Dictionary verification results. A dictionary word estimation increases along with the word length and also depends on word style and complexity.

Spatial data. The neighboring characters (letters) should be located closely to one another in the prescribed way and should be mutually coordinated in height.

Points of linear partition data. Some of characters in pair may contact each other.

Supplementary rules for rare cases processing.

The information about text to the right from the processed fragment is not yet available during the first processing and also there may be not enough data at one's disposal to calculate the line height correctly.

However, during the first processing the supplementary information in the form of LPG plus graphemes images is not yet removed (as in the second processing), and thus available.

Therefore the final version of some characters is not defined during the first processing. Ambiguities of "capital character—small character" type in characters and of "letter—numeral" type in identifiers often remain at this step.

Second Processing.

After all the fragments of each line are examined, the second processing is started. All statistics about characters height has been already collected to this step, thus ultimate hypotheses about the line height are offered (ultimate conclusions are done). Also ultimate decision about the capital characters positions is done and corresponding interpretation versions accuracy values are estimated. Line fragments are processed from the last to the first one.

All character versions in the second processing are divided into the following groups:
  all characters are caps,
  all characters are small,
  first character is cap, and
  capital-small characters positions are selected on the base of obtained interpretations' estimations.

In a case of ambiguous interpretations remaining thereafter, they are solved according to the following general rule: only several interpretations providing the highest possible accuracy estimation are left.

An ambiguity solving is made successively by the following ways:
1. Using spatial (geometric) parameters.
2. According to capital-small characters ratio, indicated in the pattern.
3. Taking into account interpretation versions of a fragment to the left.
4. Using rules that minimize the letter-numeral switching in the letter-numeral character groups.
5. If none of the previous methods gives a result, the interpretation version is selected from several available casually.

After solving ambiguities all versions available are repeatedly estimated and pairwisely sorted. Words to the left and to the right from the processed word are taken into account at estimating and sorting. For the word placed in the last right hand position several versions of word fragments on the right side thereof, corresponding to the different hypotheses about the line height, are generated. Sorting accompanied with the estimation is performed for each word along with fragments to the right therefrom, remaining several best variants that would serve in their turn as right-hand fragments for the next word in order.

Third Processing.

After all the characters versions within the whole line are obtained, a correction thereof is performed. Since the whole line is recognized at this step, the correction is performed on the base of "syntax" information: the beginning and the end of the sentence, small and capital characters of the previous or of the next word etc.

At this correction step spaces layout is clarified on the base of spaces-of-equal-width analysis and spaces width allocation along the line, aggregation of mistakenly separated punctuators (punctuation marks, etc.) and units in numbers, corrections of mistakes as comma-dot, correction of words "Il" И"Ill" into Roman "II" И"III", correspondingly.

Chains Building on LPG.

Chains on LPG are built by one of the following ways.

The first one builds the chain that has the highest total accuracy value. It uses standard method of the best chain building for a directed acyclic graph (DAG).

The second way (named here "generator") examines all chains of LPG, from the best one to the worst one in the accuracy descending order thereof.

The necessity of the separate method of the first (the best) way building is that on the one hand, the first method works faster than the "generator", but on the other hand, the first (the best) chain turns out to be the only possible one.

Both methods take into account all versions of graphemes allowable in the chains of LPG. Moreover, the "generator" can build only arc chains, determined by allowable trigrams or for example by dictionary check that allows deepening of the examination by early eliminating of deliberately wrong ways.

Recognition results versions and the concrete definition thereof.

The main result of the supplementary data application is one or more (a plurality of) word versions. Since grapheme translation into character (letter) is often ambiguous, all the obtained (set of) characters versions are saved for each grapheme. As far as supplementary data becomes available (dictionary, line geometry, fragment on the left and on the right) the number of versions gradually decreases. The versions number decrease during the first processing is achieved by the use of patterns taking into account grammar rules and dictionary. The next suitable versions number decrease occurs during the second processing.

The Alike Graphemes Recognition Method.

There are pairs of very alike graphemes: "O" (letter) and "0" (numeral), "1" (one) and "l" (small letter "L"), "1" (one) and "I" (capital letter "i"), etc.

For the best recognition thereof a supplementary interpretation is to be performed. Each grapheme from a pair of alike ones is interpreted into letters, corresponding to both graphemes in the pair. Some interpretations are considered as basic, and the others—as subsidiary.

For example graphemes "O" (letter) and "0" (numeral) have the following interpretation versions:
  "O" (letter)→"O" (letter) basic,
  "O" (letter)→"o" (letter) basic,
  "O" (letter)→"0" (numeral) subsidiary,
  "o" (letter)→"0" (numeral) subsidiary,
  "0" (numeral→"0" (numeral) basic.

If dictionary and grammar rules give not enough grounds for a single meaning choice of an interpretation, the basic one is selected.

Generalized Graphemes.

To recognize divided characters a method of paired substitutions in LPG is used. Certain generalized graphemes <<||>> И<<|||>> are artificially created for two-element and three-element graphemes. The said graphemes are interpreted into all two-element and three-element characters (letters), considering the said interpretations as subsidiary. The final (conclusive) choice is realized after applying other supplemental information.

Recognition accuracy estimations assignment considering supplementary data.

Integral and differential estimations are used. Integral estimation comprises basic accuracy estimation through the LPG chain, pattern accuracy, and complementary accuracy. Differential estimation is used in pair-wise comparison.

Basic Chain Accuracy Estimation.

Basic chain accuracy estimation is determined as a sum of graphemes recognition accuracy estimations for all graphemes through the chain.

Pattern Accuracy.

Pattern accuracy comprises at least two estimations. The first one estimates the compliance of the version with the pattern grammar. The other one estimates the presence/absence of the word in the applied dictionary.

Complementary Accuracy.

Complementary accuracy is calculated considering a complementary list of rules. The main reasons for complementary amendments are geometric parameters unsuitable for a certain grapheme or a certain fragment on the left from the processed one, capital/small characters position, identity of languages of fragments to the left and to the right.

Figure 2:
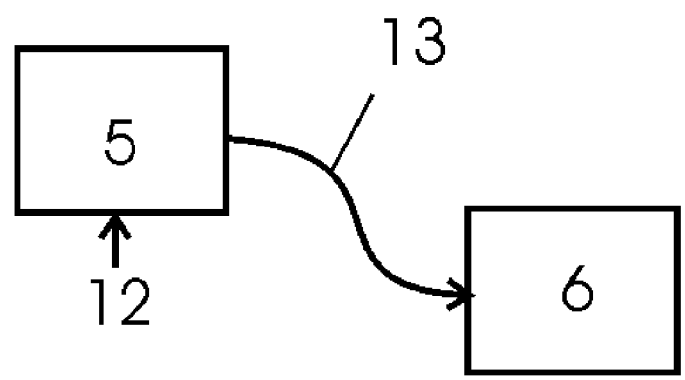
FIG. 2 shows the stage of choosing of the recognized line of characters final variant

The essence of the invention is shown on FIG. 1 and FIG. 2. After the pre-recognition steps of image partition, into regions (fragments) presumably comprising characters, the step of character recognition is performed for all obtained partition versions. A result of recognition is one or more versions of character for each character image (grapheme). Characters are combined into groups, presumably comprising words.

The essence of the applied method consists in analysis of all possible or allowable words, obtained as a combination of all possible or allowable recognition versions of composing graphical images. Groups of characters are also examined along with one or more neighboring groups from one or from both sides. A supplementary information of several types from several (one or more) different sources one after another, is applied to the obtained words to the sufficient extent for accurate word recognition.

The Due Analysis Comprises at Least the Following Steps.

The list and the order of supplementary data application is preliminarily assigned. The list and the order of the data sources application is taken from the following list.

1) Line-to-characters partition information.
2) Accuracy of graphic character (grapheme) recognition.
3) Whole words dictionary.
4) Dictionary of possible word-parts. For example, trigrams dictionary.
5) Rules, caused by the applied standard data patterns.
6) Rules, caused by the word disposition (layout, position) within a line and/or a paragraph.
7) Rules, caused by the peculiarities of the document language.
8) Rules, caused by the peculiarities of the document type.
9) Supplemental rules for rare occasions.

The said items in the list are applied one after another until the sufficiently reliable result is achieved.

If the partial use of the listed supplementary data types gives sufficiently accurate and reliable result the further (next item in the list) data type is not applied.

An accuracy estimation level for each type of the supplementary data is also preliminarily assigned.

All possible variants of partition of image regions, presumably representing text strings, into fragments, presumably relating to separate words images, are determined on the base of reliably recognized spaces.

LPG, describing partition versions of a fragment into graphical elements related to graphemes, is built for each line fragment.

The said obtained graphemes are recognized using two or more classifiers of different types, and estimation is assigned for each grapheme recognition version.

An interpretation from the said graphemes recognition versions to alphabet characters is performed taking into account the assigned estimations.

The following procedure, comprising at least three-steps is then performed.

The first step. One or more chains of recognized characters, corresponding to the recognition versions of graphical elements (graphemes) and graphemes to letters interpretation versions, are built for each LPG chain, connecting the initial and the final nodes. Obtained versions are then sorted in a descending order of recognition accuracy estimation.

The second step. All obtained versions of characters group are processed taking into account capital-small characters disposition rules. The said rules are subdivided into the following types:
all characters are capital letters,
all characters are small letters,
the first character is capital, the others are small,
version, selected as a result of estimation of executed recognized grapheme to character interpretations with use of the above mentioned first type of supplementary data.

If there is more than one version of resulting grapheme recognition, they are processed with successive applying of the following types of supplemental data according to the preliminarily assigned order, and/or by simultaneous application of all supplemental data types if necessary. An accuracy (reliability) estimation is assigned to each obtained result. Character versions, with the estimation lower than the preliminarily assigned level, are discarded. The final complete of versions is sorted using pair wise comparison.

The third step. The supplemental space recognition correction is performed for spaces mistakenly recognized on the previous steps:
combination of elements, mistakenly divided on the previous steps,
division of elements, mistakenly combined on the previous steps.

Rules, caused by document language, may comprise phonetic and/or lexical and/or semantic rules.

During the secondary estimation and sorting one or more words to the right from the very right word are generated, corresponding to different hypotheses (line height, for example). For each said the very right word the estimation and sorting is performed with several words to the right, and several best versions are accepted, the said versions are then used as a supplemental data for the next word in order (in disposition, in layout).

There is means for addition of new rules and restrictions and modification of existing ones.

Means for new rules and restrictions addition may comprise addition of rules for data types. The said data types may be subdivided into simple and compound ones, at that the compound data types are formed as a combination of two or more simple ones, or as any combination of simple and compound or compound and compound ones.

Data type is specified as a set of at least the following parameters:
a list of characters allowable for use in words and/or
supplemental rule, restricting the list of characters, and/or
a list of punctuators allowable for use, and/or
grammar rules for frequently used words or word fragments.

Restrictions comprise the use of one or more of the following pattern types:
bilingual word,
bilingual word with numerals,
dictionary identifier,
abbreviation,
number,
Roman number, (numerals),
number with suffix (ordinal number),
number with prefix,
word composed of punctuators,
word+number,
number within a word,
word including brackets,
telephone number,
URL pattern, filename with the full path,
regular expressions pattern,
supplementary pattern.

The following is a more detailed description of some of the listed pattern types meaning, not obvious from its name.

Regular expression pattern is a method of words description using regular expressions.

A regular expression is a complicated formalized data pattern, comprising data of a simple type.

A word is considered as preferable if it corresponds to the regular expression description.

Data of a simple type—a set of words inscribed in a particular dictionary. A particular dictionary of a limited volume shows the most likely words to be used in a document and on option the most unlikely ones. A word is considered as most likely one if it is in the particular dictionary.

A regular expression is a way of formal description of "preferred" words. For example, the following regular expression:

w[io]n

This regular expression shows that in order to be a preferred one the word should consist of three characters, it should begin with letter "w", finish with letter "n" and have one of letters "i" or "o" inside. Thus the appropriate (suitable) words are "win" and "won".

Another example refers to numbers.

(99999)|(999999)

This regular expression means that the preferred number comprises five or six digits.

Some other examples.

s?t may mean "sat" or "set".
s*d may mean "sad" or "started".
w[io]n may mean "win" or "won".
[r-s]ight may mean "right" or "sight".
m[!a]st may mean "mist" or "most", but not "mast".
t[!a-m]ck may mean "tock" or "tuck", but not "tack" or "tick".
fe{2}d may mean "feed" but not "fed".
fe{1, }d may mean "fed" or "feed".
10{1, 3} may mean "10", "100", or "1000".

Supplemental pattern. This type of pattern is used in a case, when none of the others fits. For example, if the following word—"Sth12Xz" is found inside an English word, none of text type patterns can identify it. In this case a supplemental pattern is used.

The invention claimed is:

1. A computer-implemented method for text data recognition, comprising
    obtaining an image file from scanning device or from other source,
    preliminarily assigning at least a part of a list of applied supplementary data types and an order of application of the supplementary data types in the list, said list comprising, in order of application:
        a line-to-graphemes parsing information,
        a graphical element (grapheme) recognition quality,
        a whole words dictionary,
        a dictionary of permissible word fragments,
        rules, prescribed by applied standard data patterns or regular expressions,
        rules, prescribed by word disposition within the line or the paragraph,
        rules, prescribed by the document language peculiarities,
        rules, prescribed by the document type peculiarities, and supplementary rules for rare occasions,
    preliminarily assigning of an accuracy estimation for each type of supplementary data,
    performing one or more line-to-fragments parsing versions by reliably recognized spaces, said fragments presumably comprising single word images,
    building of line partition graph (hereinafter LPG) for each line fragment, said graph describing fragment-to-graphemes parsing versions, said graphemes presumably comprising character images,
    performing single graphemes recognition, using two or more classifiers of different types,
    assigning each said grapheme recognition version accuracy estimation,
    interpretation of grapheme recognition version as a character version,
    performing at least the following steps:
        the first step:
            for each LPG chain connecting initial node and final node, building a set of chains using all obtained recognized grapheme-to-character versions,
            calculating a total recognition accuracy level for each said chain,
            sorting obtained results in a total recognition accuracy descending order,
        the second step:
            analyzing all obtained character group versions using supplemental information about capital-small characters disposition,
            in a case of more than one grapheme-to-character recognition version being available, analyzing each said obtained recognition version with the application the supplemental data types in connection with the preliminarily assigned order to gain a prescribed recognition accuracy,
            assigning to each obtained version an accuracy estimation,
            discarding character versions having said accuracy estimation lower, than the preliminarily assigned level,
            sorting the remain versions in a descending order using pair wise comparison;
        the third step:
            performing a supplementary space recognition correction with respect to a previously mistakenly recognized spaces comprising:
                joining of previously mistakenly separated elements,
                separation of previously mistakenly combined elements.

2. The method as recited in claim 1, where said rules, prescribed by the document language peculiarities is selected from the group comprising phonetic rules, lexical rules, and semantic rules.

3. The method as recited in claim 1, where said capital-small characters disposition comprises types selected from the group consisting of a type where all characters are capital characters, a type where all characters are small characters, and a type where the first character is a capital character and all the others are a small version, based on the performed grapheme-to-character interpretations with the use of the said line-to-graphemes parsing information.

4. The method as recited in claim 1, where a particular dictionary of commonly used word fragments is applied.

5. The method as recited in claim 4, where each word fragment is provided with the application likelihood estimation thereof.

6. The method as recited in claim 4, where the dictionary of commonly used word fragments comprises characters type restrictions selected from the group consisting of: bilingual words, bilingual words with numerals, dictionary identifiers, abbreviations, and/or numbers, Roman numbers, numbers with suffix, numbers with prefix, words composed of punctuators, words and a number, numbers within a word, words including brackets, and/or telephone numbers, and/or uniform resource locator URL patterns, filenames with a full path, and/or regular expression patterns, and supplementary patterns.

7. The method as recited in claim 1, further comprising rules for a new rules and/or restrictions addition, adding new data types based on a rule, where said new data types is one of a simple and a compound data type.

8. The method as recited in claim 7, where said compound data type is selected from the group consisting of at least two components of a simple type, and a combination of simple and compound components.

9. The method as recited in claim 7, where said new data type is assigned in a form comprising parameters selected from the group consisting of a list of characters allowed for use in words, a supplementary rule restricting allowed characters, a set of allowed punctuators, and grammar rules for frequently used words or fragments thereof.

10. The method of claim 1, wherein the supplemental data is applied successively.

11. The method of claim 1, wherein the supplemental data is applied jointly.

* * * * *